Oct. 31, 1939.　　　R. E. LARKEY　　　2,178,397
ELECTRIC WATER HEATER
Filed Dec. 7, 1937

INVENTOR.
Riley Emery Larkey
BY　*Hoery Hamilton*
ATTORNEYS

Patented Oct. 31, 1939

2,178,397

UNITED STATES PATENT OFFICE 2,178,397

ELECTRIC WATER HEATER

Riley Emery Larkey, Kansas City, Mo.

Application December 7, 1937, Serial No. 178,527

1 Claim. (Cl. 219—41)

This invention relates to heating devices and particularly to electric water heaters for use in the well-known commercial type, flexible hot water bottle, and the primary object of this invention is to provide such an electric water heater wherein is embodied means for insuring that a portion of the heat generating member is kept moist so long as there is any liquid in the bottle with which the electric water heater is associated.

Another important aim of this invention is to provide an electric water heater for liquid containers that will not unduly restrict the flexibility of the liquid container during use and which will function to heat the liquid regardless of the position of the container.

Other important features of this invention which form the objects thereof, include the provision of a cheaply constructed, durable and efficient water heater for hot water bottles; the provision of means in the heater structure for safeguarding the user thereof against overheating; the provision of unique and novel methods of assembling the heater so that it may be economically and quickly manufactured and sold at an attractive figure.

Other objects of the invention will appear during the course of the following specification, referring to the accompanying drawing wherein.

Figure 1:
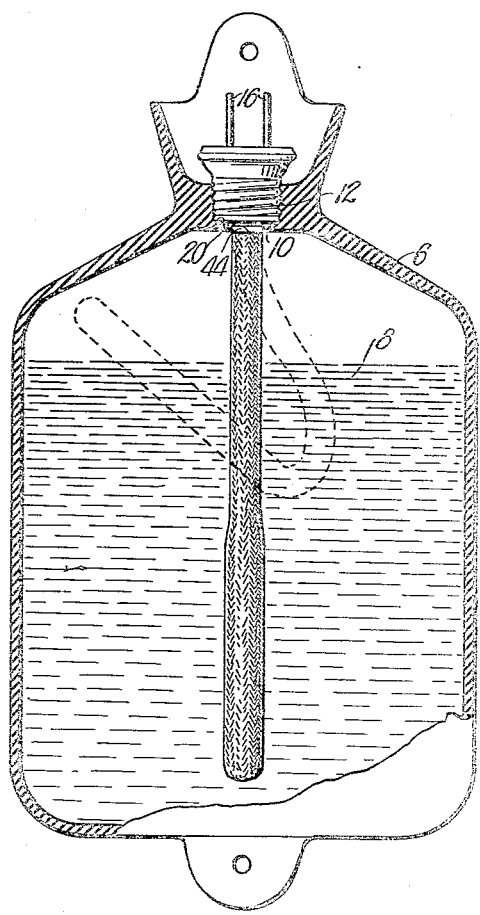
Figure 1 is a side elevation of an electric water heater embodying this invention and illustrating the same in operative combination with the conventional type of water bottle.
Figure 2:
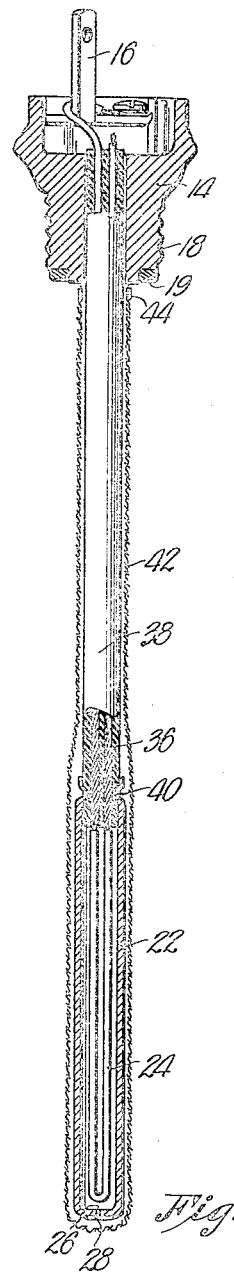
Fig. 2 is an enlarged fragmentary longitudinal central sectional view through the water heater showing the same removed from operative position.

The type of liquid container 6, with which this water heater is adapted to be associated, is illustrated in Fig. 1 and comprises the ordinary rubber hot water bottle wherein water 8 is contained. The neck 10 of container 6 is internally threaded as at 12 and under ordinary conditions a plug, not here shown, is used to close this neck and preclude the escape of water.

When the electric water heater embodying the concepts of this invention is to be used, a plug 14 is provided which has the conventional prongs 16 forming a part thereof, which prongs are in turn connected to a suitable source of electric energy. Plug 14 has screw threads 18 on the outer annular face thereof, which engage internal threads 12 of neck 10 so that the said plug is moved to the operative position and held thereat in the well-known manner. A gasket 19 rests against a shoulder 20 formed in the neck 10 so that liquid 8 will not escape.

In constructing the heater in accordance with the preferred form of the invention, a metallic case 22 is provided to contain a heating element 24. This case 22 is in the form of an elongated cup, through the bottom wall of which is formed a hole 26—this hole is filled with fusible material 28 for the purpose hereinafter set down.

Figures 3, 4:
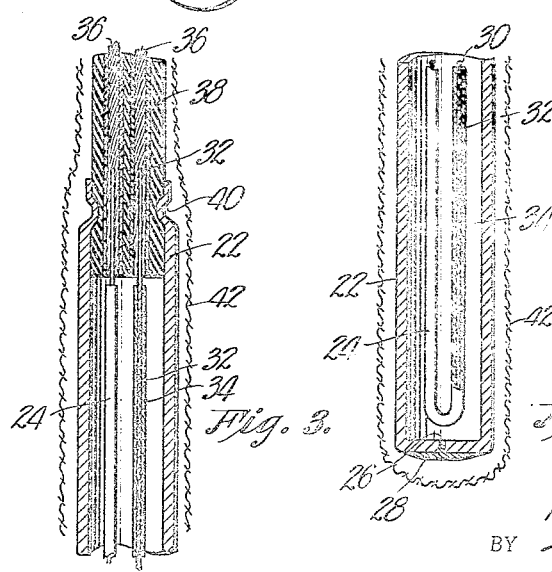
Fig. 3 is a fragmentary longitudinal sectional view through a portion of the heater at the zone of connection between metal case and insulated conducting materials.
Fig. 4 is a similar view showing a portion of the heating element of the submersion type which forms a part of the water heater assembly.

The heat generating element 24 is made as shown in Fig. 4. A thread or cord 30 of asbestos substance is wrapped with a fine metallic wire 32 of high resistance substance, and then an asbestos jacket 34 is placed over wire 32. This element 24 generates heat within case 22 and this heat is transmitted to liquid 8 through the metal walls of case 22.

Wire 32 is connected to ordinary copper wires 36 which extend down through a heavy, flexible rubber insulation 38 from prongs 16. The mode of connecting together the ends of wire 32 and wires 36 is clearly indicated in Fig. 3, and after the solid wires 32 are forced into the strands forming wires 36, case 22 is pressed inwardly as at 40. This crimping or inward pressing forces together wires 36, wire 32, insulating material 38 and case 22. A water tight joint is formed at the zone of connection, shown in Fig. 3.

The length of flexible insulated conducting materials 36 is appreciably greater than the length of case 22 so that the flexible container might be applied to any member of the body and wrapped about the same without affecting the operating of the heating element.

When hot water bottles are used to apply heat they must assume unusual forms and shapes and therefore constantly heating the liquid 8 therein becomes a problem.

So long as there is any water 8 within the container 6, the heater formed as illustrated, will operate without destructive force.

A stocking 42 of absorbent material encases metal case 22 and insulation 38. This stocking 42 extends from plug 14 throughout the length of the parts of the heater which are projected into container 6, and a clamp 44 secures the end of stocking 42 in place so that it cannot be accidentally withdrawn.

The material from which stocking 42 is made should be in the nature of a wick and therefore, the same will always be maintained moist so as to prevent heating element 24 from raising the temperature of case 22 to an undesirably high degree. In the event heating element should overheat case 22, fusible material 28 will drop out of hole 26 and the vapors created within container 6 will enter case 22 and serve to destroy the action of heating element 24.

It has been found that when this hole 26 is opened in the manner indicated, the very fine resistance wire 32 will immediately part and break the continuity of the circuit.

Stocking 42 also serves as means for electrically insulating the parts which it contains if the wires 36 or element 24 should become uncovered. This stocking also acts as an effective padding between metal member 22 and the body of container 6 to preclude destructive friction.

The advantageous results obtained through the employment of an electric water heater made as shown and described, at once become apparent to those skilled in the art, and while the preferred embodiment of the invention has been made clear, it is desired to be limited only by the spirit of the invention and scope of the appended claim.

Having thus described the invention, what is claimed as new and desired to be secured by Letters Patent is:

An electric water heater of the character described comprising a plug formed for attachment to the neck of a flexible liquid container; a metal case; a heat generating element within the case; a length of flexible insulated conducting material joining the heat generating element and the plug; and a fabric stocking of absorbent material incasing the metal case and said length of flexible insulated conducting material; said metal case having a water-tight connection with the said length of insulated conducting material and provided with a hole through the wall thereof there being a filling of fusible material normally closing the hole for the purpose specified.

RILEY EMERY LARKEY.